United States Patent [19]

Schmidt et al.

[11] Patent Number: 4,643,885

[45] Date of Patent: Feb. 17, 1987

[54] METHOD OF PROCESSING SODIUM OXALATE FORMED DURING THE DIGESTION OF BAUXITE

[75] Inventors: Hans-Werner Schmidt, Frankfurt am Main; Walter Koch, Mühlheim am Main; Martin Hirsch, Friedrichsdorf; Karlheinz Rosenthal, Neu-Isenburg, all of Fed. Rep. of Germany; Yilmaz Yetmen, Corpus Christi, Tex.

[73] Assignee: Metallgesellschaft AG, Frankfurt am Main, Fed. Rep. of Germany

[21] Appl. No.: 713,461

[22] Filed: Mar. 19, 1985

[30] Foreign Application Priority Data

Mar. 28, 1984 [DE] Fed. Rep. of Germany ....... 3411414

[51] Int. Cl.$^4$ ................................................ C01F 7/04
[52] U.S. Cl. .................................... 423/119; 423/121; 423/130
[58] Field of Search ............... 423/121, 122, 130, 600, 423/119

[56] References Cited

U.S. PATENT DOCUMENTS 4,280,987  7/1981  Yamada et al. .................... 423/130

*Primary Examiner*—H. T. Carter
*Attorney, Agent, or Firm*—Felfe & Lynch

[57] ABSTRACT

In a method for processing contaminated sodium oxalate which becomes available in a separating stage succeeding the digestion of bauxite in accordance with the Bayer process, chemicals used in the digesting process are recovered in that the moist sodium oxalate which has been separated is dried with the hot exhaust gases from a fluidized bed, particularly a circulating fluidized bed, jointly with aluminum hydroxide or aluminum oxide hydrate and/or reactive alumina at a mole ratio of aluminum to sodium of at least 0.8 and the dried product is decomposed in said fluidized bed at a temperature of 780° to 1000° C. to form sodium aluminate. Suitably drying is effected by spray drying in direct contact with the exhaust gases of the fluidized bed and decomposition is effected at a temperature in the range from 850° to 950° C. and with an Al:Na mole ratio not in excess of 1.2.

11 Claims, 1 Drawing Figure

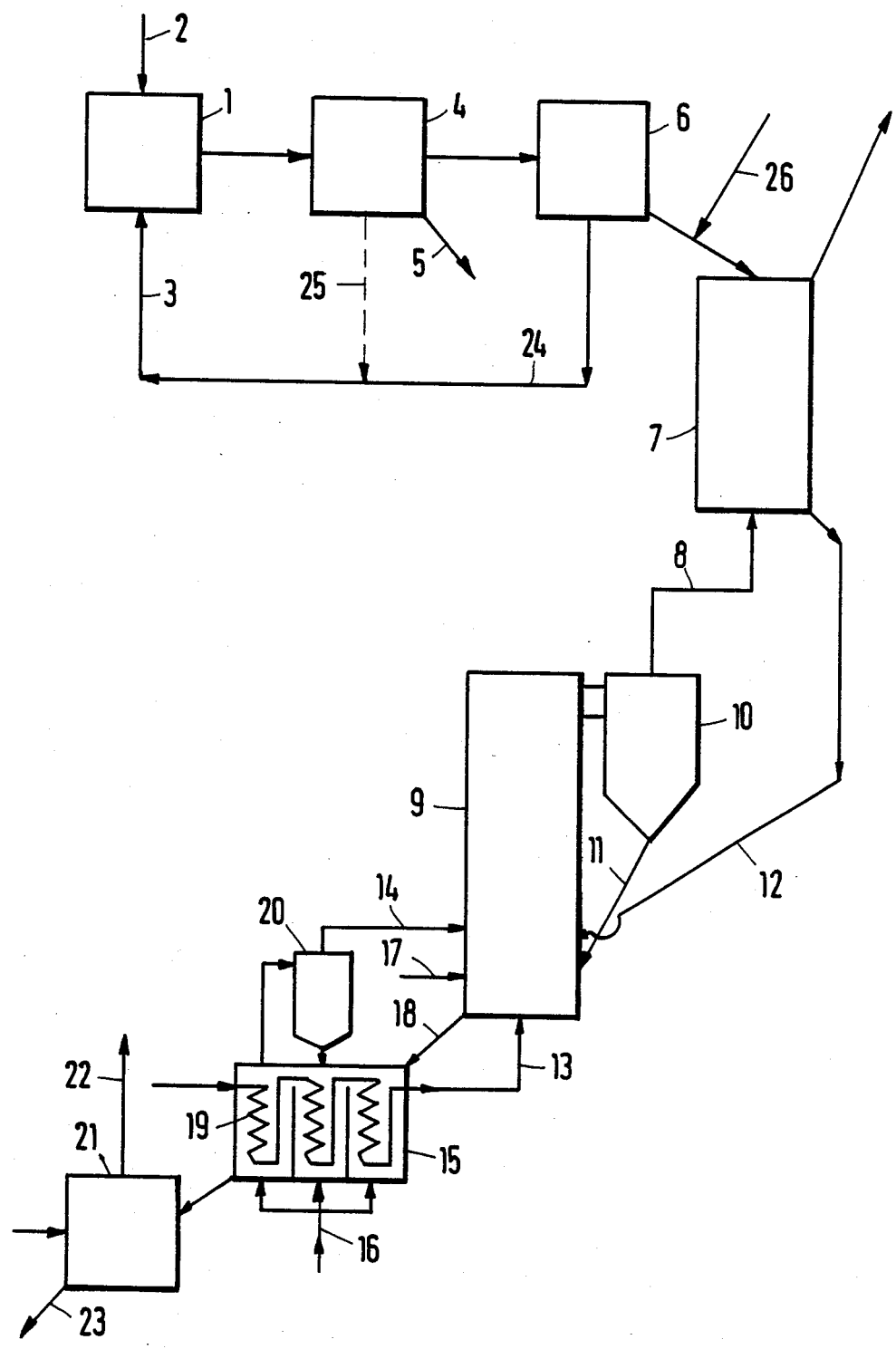

METHOD OF PROCESSING SODIUM OXALATE FORMED DURING THE DIGESTION OF BAUXITE

BACKGROUND OF INVENTION

This invention relates to a method of processing contaminated sodium oxalate which becomes available in a separating stage succeeding the digestion of bauxite in accordance with the Bayer process.

Numerous bauxites contain organic substances so that the digestion of such bauxites in accordance with the Bayer process results in the formation of sodium oxalate, which is progressively enriched in the circulated extracting solvent. When a certain concentration of sodium oxalate has been exceeded, the latter will adversely affect the crystallization of aluminum hydroxide so that a higher proportion of fine-grained product will be formed during the subsequent calcination. Besides, the results of the filtration of the crystalline aluminum hydroxide are much less satisfactory.

In view of the facts outlined above, the sodium oxalate must be removed at least in part from the circulating extraction solvent. This can be effected, e.g., by an oxidizing decomposition effected by a treatment with oxygen or oxygen-containing gases under elevated pressure and at elevated temperature (Published German Application No. 29 45 152). That treatment takes a time of 30 to 60 minutes and requires highly expensive equipment.

Alternatively, sodium oxalate can be removed from the circulating extraction solvent by crystallization. But that practice requires a separation or further processing which is expensive and often results in products which cannot be used in the production of alumina. For instance, the sodium oxalate which is initially obtained can be reacted with milk of lime to form calcium oxalate and sodium hydroxide solution, which is recycled to the extraction process (U.S. Pat. No. 3,649,185). In another process, calcium oxalate precipitated by a treatment with milk of lime is reacted with sulfuric acid so that oxalic acid is formed (Published German Application No. 25 53 870).

It is an object of the invention to provide a method for the processing of the oxalate formed by digestion according to the Bayer process which can be integrated in the digesting process and involves only a low expenditure.

SUMMARY OF THE INVENTION

This object is accomplished in that the process of the kind described first hereinbefore is carried out in accordance with the invention in such a manner that the moist sodium oxalate, which has been separated, is dried with the hot exhaust gases from a fluidized bed jointly with aluminum hydroxide or aluminum oxide hydrate and/or reactive alumina at a mole ratio of aluminum to sodium of at least 0.8. The dried product thus obtained is decomposed in said fluidized bed at a temperature of 780° to 1000° C. to form aluminate.

Reactive alumina is an oxide which participates in the required reaction under the selected reaction conditions.

The sodium oxalate to be processed in accordance with the invention is accompanied by aluminum hydroxide and adhering extraction solvent. The mix, which is fed to the drying stage, must previously be adjusted to a mole ratio of at least 0.8 of aluminum to sodium. This can be accomplished in that the separation or crystallization of sodium oxalate and the previous separation or crystallization of aluminum hydroxide are suitably controlled relative to each other. If the crystallized sodium oxalate is not accompanied by an adequate quantity of aluminum, the additional aluminum which is required can be admixed as crystalline aluminum hydroxide, which may have been crystallized before, or as crystalline aluminum oxide hydrate and/or as reactive alumina. In the determination of the aluminum requirement it is necessary to take the sodium content of the crystallized sodium oxalate into account as well as the sodium content contained in the adhering extraction solvent, particularly of the sodium hydroxide solution.

Sodium aluminate may be formed in any desired fluidized bed reactor, e.g., in an orthodox fluidized bed. Particularly as regards throughput rate it will be particularly advantageous, however, to effect the reaction in a so-called circulating fluidized bed, which is provided in conventional equipment. This means that the fluidized bed reactor may be circular, square or rectangular in cross-section and may be provided with a grate or a venturi-like inlet for charging the fluidizing gas. The reactor area and the gas rate are so selected in consideration of each other that the mean density of the suspension in the fluidized bed reactor is approximately in the range of 20 to 150 kg per $m^3$ of the reactor volume. A difference between a circulating fluidized bed and an orthodox fluidized bed resides in that in the latter there is a distinct density step between the fluidized bed and the overlying gas space whereas in the circulating fluidized bed the entire fluidized bed reactor is filled with a gas-solids suspension and the density of the suspension decreases from bottom to top. (Information regarding the mode of operation of circulating fluidized beds is apparent, e.g., from L. Reh et al. "Wirbelschicht-prozesse für die Chemie- und Hüttenindustrie, die Energieumwandlung und den Umweltschutz", Chem. Ing. Techn., 55 (1983), No. 2, pages 87-93).

When the required mole ratio has been adjusted, the filter cake, usually containing 25 to 40 wt. % adhereing moisture, is dried by means of the hot exhaust gases from a fluidized bed. That drying can generally be carried out with any equipment which can be used to treat high-moisture streams of solids.

In particularly preferred embodiments of the invention, the moist solids are dried in direct contact with the exhaust gases from the fluidized bed, particularly in a spraying process. In the latter case the moist solids may be suitably charged by means of a rotating atomizing disc into the spray-drying tower.

The dried product is directly fed into the fluidized bed reactor, wherein sodium oxalate is decomposed with formation of sodium aluminate by a reaction with the accompanying aluminum hydroxide or partly dehydrated aluminum hydroxide. Regardless of the quantity of aluminum which is available, there will be no clogging at temperatures up to 830° C. so that a satisfactory operation of the fluidized bed system can be expected. On the other hand, certain quantities of sodium carbonate may be formed at relatively low temperatures resulting in a loss of sodium ions required in the digesting process. At temperatures above 830° C. the process in accordance with the invention is more sensitive and will require the presence of an adequate quantity of aluminum. It can be stated in general that higher aluminum contents permit higher temperatures in the fluidized bed. Higher temperatures, e.g., above about 850° C., afford the advantage that sodium carbonate formation is negligible and any existing sodium carbonate will react to form sodium hydroxide and/or sodium aluminate.

In accordance with a preferred further feature of the invention, sodium oxalate is decomposed at a temperature in the range from 850° to 950° C. and the mole ratio of aluminum to sodium is maintained at or below 1.2. This will avoid a loading of the processing stage with aluminum which is not required for the reaction and in an excessive dilution of the sodium aluminate with alumina. For instance, the sodium carbonate content will then reliably be less than about 4 wt. % and the sodium aluminate content will be between about 60 and 85 wt. %.

The invention affords a number of advantages including that no products are formed which are alien to the process of producing alumina and which would have to be used for different purposes or to be dumped so that they would pollute the environment. Most of the aluminum hydroxide required for the reaction with the sodium oxalate is recycled to the process of producing alumina as soluble sodium aluminate. In the preferred embodiment of the invention using reaction temperatures above 850° C., active sodium hydroxide or sodium aluminate is even formed from the sodium carbonate, which is not active in the extraction process.

The various features of novelty which characterize the invention are pointed out with particularity in the claims annexed to and forming a part of this specification. For a better understanding of the invention, its operating advantages and specific objects obtained by its use, reference should be had to the accompanying drawing and descriptive matter in which there is illustrated and described a preferred embodiment of the invention.

BRIEF DESCRIPTION OF THE DRAWING

The drawing is a flow diagram schematically depicting the process in accordance with the invention.

DESCRIPTION OF PREFERRED EMBODIMENT

Referring to the drawing, a digesting reactor 1, preferably in the form of a tubular reactor, is fed with bauxite through line 2 and with extraction solvent through line 3. After an adequate treatment time the extraction solvent enters the agitating separator 4, in which aluminum hydroxide is separated and discharged by a device 5. Sodium oxalate is separated in the unit 6, e.g., by a sufficiently intense evaporation, and is charged together with adhering liquid extraction solvent into the dryer 7, which is preferably a spray dryer. Spray dryer 7 is supplied through line 8 with hot exhaust gas from the fluidized bed system, which comprises the fluidized bed reactor 9, the recycling cyclone 10 and the return line 11. The dry product is supplied through line 12 directly into the fluidized bed reactor 9 which is fed with oxygen-containing fluidizing gas through line 13 and with oxygen-containing secondary gas through line 14. The two gas streams come from the fluidized bed cooler 15, which succeeds the fluidized bed reactor 9 in the solids flow path and to which the secondary gas is supplied through line 16 to act as a turbulencing fluid. The fluidizing gas is conducted past cooling surfaces 19 to act as an indirect coolant. Fuel for heating the circulating fluidized bed is fed through a lance 17 between the fluidizing gas inlet 13 and the secondary gas inlet 14. The solids are circulated through the fluidized bed reactor 9, the recycling cylone 10 and the return line 11 for an adequate dwell time. After that dwell time the solids are withdrawn as a continuous stream through the discharge device 18 and are cooled in the fluidized bed cooler 15. This is effected by means of a stream of oxygen-containing gas which is conducted past the cooling surface structure 19, which extends into the several chambers of the fluidized bed cooler 15, and by means of fluidizing gas. These gases are supplied to the fluidized bed reactor 9 in the manner described hereinbefore. Before entering the fluidized bed reactor 9, the stream of fluidizing gas is passed through a cyclone separator 20 for a removal of substantially all dust.

The stream of cooled solids then enters a container 21, in which it is slurried with extraction solvent. The two phases of the slurry are subsequently processed further in a suitable manner and/or are supplied (in lines 22 and 23) to the appropriate process stages.

Solvent separated in the separator 6 is recycled in line 24 to the digesting reactor 1. Part of the solution from which aluminum hydroxide has been removed can be by-passed around the separator 6 in a line 25. If the crystal sludge formed in the separator 6 does not have an adequate aluminum content in the form of adhering solution or crystallized aluminum hydroxide, aluminum hydroxide can be added, (e.g., from discharge device 5) via conduit 26.

EXAMPLE 1

The pregnant solution leaving the agitating separator 4 is evaporated in the separator 6 to form filter cake at a rate of 3800 kg/h. That filter cake consists of

| | |
|---|---|
| 26 wt. % of sodium oxalate | (calculated as $Na_2C_2O_4$) |
| 34 wt. % aluminum hydroxide | (calculated as $Al(OH)_3$) |
| 40 wt. % adhering pregnant solution | |

The pregnant solution contains

| | |
|---|---|
| 82 g/l sodium aluminate | (calculated as $NaAlO_2$) |
| 107 g/l sodium hydroxide | (calculated as $NaOH$) |
| 13 g/l sodium carbonate | (calculated as $Na_2CO_3$) |
| 918 g/l water | |

The filter cake has an Al:Na mole ratio of 0.88 and is fed to a spray dryer 7 together with a sludge, which has been formed in the gas-purifying plant of the exhaust gas of the spray dryer and is supplied at a rate of 500 kg/h. In the spray dryer, drying is effected with gases at 900° C. which come from the succeeding circulating fluidized bed. The gas rate is 3646 sm$^3$/h. Exhaust gas is withdrawn from the spray dryer 7 at a temperature of about 260° C. and at a rate of 5510 sm$^3$/h.

Solids at a temperature of 206° C. become available in the spray dryer at a rate of 2606 kg/h and are supplied in line 12 to the fluidized bed reactor 9 of the circulating fluidized bed system. The fluidized bed reactor 9 is heated by the combustion of fuel oil having a calorific value of 40 MJ/kg and supplied through line 17 at a rate of 182 kg/h. Secondary gas is fed through line 14 at a rate of 1809 sm$^3$/h and at a temperature of 527° C. The fluidizing gas is at a temperature of 319° C. and is fed to the fluidized bed reactor 9 through line 13 at a rate of 903 sm$^3$/h.

A temperature of 900° C. is obtained in the circulating fluidized bed system comprising the fluidized bed reactor 9, the recycling cyclone 10 and the return line 11. The mean density of the suspension throughout the fluidized bed reactor amounts to 80 kg per m³ of the reactor volume. Exhaust gas is withdrawn from the circulating fluidized bed at a rate of 3646 sm³/h and has the following composition:

| | |
|---|---|
| 58.7 vol. % | $N_2$ |
| 2.2 vol. % | $O_2$ |
| 17.0 vol. % | $CO_2$ |
| 22.1 vol. % | $H_2O$ |

Product at a rate of 1595 kg/h is withdrawn from the fluidized bed reactor 9 and supplied in line 18 to the fluidized bed cooler 15 and is cooled in the latter to 193° C. by means of fluidizing air at a rate of 1809 sm³/h and of secondary air, which is conducted past a cooling surface 19 at a rate of 903 sm³/h.

The product obtained at the rate of 1595 kg/h and composed of:

| | |
|---|---|
| 80 wt. % sodium aluminate | (calculated as $NaAlO_2$) |
| 3.5 wt. % sodium carbonate | (calculated as $Na_2CO_3$) |
| 8.0 wt. % sodium hydroxide | (calculated as NaOH) |
| 8.5 wt. % alumina | (calculated as $Al_2O_3$) | is slurried in the container 21 with extraction solvent supplied at a rate of 40 m³/h and is separated by filtration into a liquid phase and a solid phase consisting mainly of alumina.

EXAMPLE 2

The filter cake to be processed has the following composition:

| | |
|---|---|
| 23.3 wt. % sodium oxalate | (calculated as $Na_2C_2O_4$) |
| 36.7 wt. % aluminum hydroxide | (calculated as $Al(OH)_3$) |
| 40 wt. % adherent pregnant solution | |

The Al:Na mole ratio is 1.03.

Under the same conditions as in Example 1, a product is obtained which is composed of:

| | |
|---|---|
| 70 wt. % sodium aluminate | (calculated as $NaAlO_2$) |
| 3.5 wt. % sodium carbonate | (calculated as $Na_2CO_3$) |
| 8.0 wt. % sodium hydroxide | (calculated as NaOH) |
| 18.5 wt. % alumina | (calculated as $Al_2O_3$) |

It will be understood that the specification and examples are illustrative but not limitative of the present invention and that other embodiments within the spirit and scope of the invention will suggest themselves to those skilled in the art.

We claim:

1. A method of processing contaminated sodium oxalate which becomes available in a separating stage succeeding the digestion of bauxite in accordance with the Bayer process, comprising drying the separated moist sodium oxalate with hot exhaust gases from a fluidized bed jointly with aluminum hydroxide or aluminum oxide hydrate and/or reactive alumina at a mole ratio of aluminum to sodium of at least 0.8 to form a dried product, and decomposing the dried product in said fluidized bed at a temperature of 780° to 1000° C. to form sodium aluminate.

2. The method of claim 1, wherein the dried product is decomposed in a circulating fluidized bed.

3. The method of claim 1, wherein the drying is effected by direct contact with the exhaust gases of the fluidized bed.

4. The method of claim 2, wherein the drying is effected by direct contact with the exhaust gases of the circulating fluidized bed.

5. The method of claim 3, wherein the drying is effected by spray drying.

6. The method of claim 1, wherein the decomposition is effected at a temperature in the range of 850° to 950° C.

7. The method of claim 2, wherein the decomposition is effected at a temperature in the range of 850° to 950° C.

8. The method of claim 2, wherein a mean density of suspension of 20 to 150 kg per m³ reactor volume is maintained during the decomposition.

9. The method of claim 1, wherein the Al:Na mole ratio in the sodium oxalate to be dried is in the range of 0.8 to 1.2.

10. The method of claim 1, wherein the mole ratio of Al:Na in the sodium oxalate to be dried is adjusted to a range of 0.8 to 1.2.

11. A method of processing Bayer process liquor contaminated with sodium oxalate comprising:
 processing Bayer process liquor to obtain a filter cake containing sodium oxalate;
 drying the filter cake with hot exhaust gases from a fluidized bed jointly with aluminum hydroxide or aluminum oxide hydrate and/or reactive alumina at a mole ratio of aluminum to sodium of at least 0.8 to form a dried product; and
 decomposing the dried product in a fluidized bed at a temperature of 780° to 1000° C. to form sodium aluminate.

* * * * *

UNITED STATES PATENT AND TRADEMARK OFFICE
CERTIFICATE OF CORRECTION

PATENT NO.   : 4,643,885

DATED        : February 17, 1987

INVENTOR(S)  : Hans-Werner Schmidt et al.

It is certified that error appears in the above-identified patent and that said Letters Patent is hereby corrected as shown below:

Title page, Item [73] Assignee: "Metallgesellschaft AG, Frankfurt am Main, Fed. Rep. of Germany"

should read -- Metallgesellschaft AG, Frankfurt am Main, Fed. Rep. of Germany and Reynolds Metals Company Richmond, Virginia 23261 --

Signed and Sealed this

Fifteenth Day of December, 1987

Attest:

DONALD J. QUIGG

*Attesting Officer*   *Commissioner of Patents and Trademarks*